US009802592B2

(12) United States Patent
Okano et al.

(10) Patent No.: US 9,802,592 B2
(45) Date of Patent: Oct. 31, 2017

(54) BRAKE CONTROL DEVICE

(71) Applicants: ADVICS CO., LTD., Kariya, Aichi-pref. (JP); TOYOTA JIDOSHA KABUSHIKI KAISHA, Toyota-shi, Aichi-ken (JP)

(72) Inventors: Takahiro Okano, Chiryu (JP); Daisuke Nakata, Seto (JP); Yusuke Kamiya, Okazaki (JP)

(73) Assignees: ADVICS CO., LTD., Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 89 days.

(21) Appl. No.: 14/717,559

(22) Filed: May 20, 2015

(65) Prior Publication Data

US 2015/0336551 A1    Nov. 26, 2015

(30) Foreign Application Priority Data

May 26, 2014    (JP) .................................. 2014-107921

(51) Int. Cl.
*G06F 7/70*        (2006.01)
*G06F 19/00*    (2011.01)
(Continued)

(52) U.S. Cl.
CPC ............ *B60T 13/662* (2013.01); *B60T 7/042* (2013.01); *B60T 8/171* (2013.01); *B60T 8/326* (2013.01);
(Continued)

(58) Field of Classification Search
CPC .... B60T 13/142; B60T 13/146; B60T 13/662; B60T 13/141; B60T 13/145; B60T 13/72;
(Continued)

(56) References Cited

U.S. PATENT DOCUMENTS 5,967,628 A * 10/1999 Abe .......................... B60T 7/12
188/353
2007/0210642 A1* 9/2007 Niino ..................... B60T 8/4081
303/11

(Continued)

FOREIGN PATENT DOCUMENTS

JP        2004-161174 A    6/2004
WO    2014/102983 A1    7/2014

*Primary Examiner* — Rachid Bendidi
(74) *Attorney, Agent, or Firm* — Buchanan Ingersoll & Rooney PC

(57) ABSTRACT

The brake control device comprises a control mode selecting portion 64 which selects one control mode based on a detection result of the detecting portion from a control mode group including at least two control modes which are a responsiveness priority mode which gives more priority to a responsiveness of the braking force relative to an operation of a brake operating member than to a suppression of an operating noise occurred upon the generation of the preparatory hydraulic pressure and a serenity priority mode which gives more priority to the suppression of the operating noise than to the responsiveness of the braking force. The hydraulic pressure control portion controls the hydraulic pressure generating device to generate the preparatory hydraulic pressure in response to the control mode selected by the control mode selecting portion.

12 Claims, 5 Drawing Sheets

(51) Int. Cl.
  *G06G 7/00* (2006.01)
  *G06G 7/76* (2006.01)
  *B60T 13/66* (2006.01)
  *B60T 8/171* (2006.01)
  *B60T 8/32* (2006.01)
  *B60T 13/68* (2006.01)
  *B60T 8/34* (2006.01)
  *B60T 13/14* (2006.01)
  *B60T 7/04* (2006.01)

(52) U.S. Cl.
  CPC .............. *B60T 8/34* (2013.01); *B60T 13/142* (2013.01); *B60T 13/146* (2013.01); *B60T 13/686* (2013.01)

(58) Field of Classification Search
  CPC .......... B60T 13/20; B60T 13/14; B60T 13/56; B60T 13/66; B60T 13/68; B60T 13/683; B60T 7/042; B60T 7/12; B60T 8/171; B60T 8/172; B60T 8/175; B60T 8/176; B60T 8/185; B60T 8/326; B60T 8/32; B60T 8/34; B60T 8/36; B60T 8/40; B60T 8/44; B60T 8/48; B60T 8/58; B60T 8/90; B60T 8/98; B60T 8/4081
  See application file for complete search history.

(56) References Cited

U.S. PATENT DOCUMENTS

2015/0127226 A1* 5/2015 Takeuchi ............... B60T 13/66
                                               701/48
2015/0151729 A1* 6/2015 Yamasoe ................. B60T 7/042
                                               303/122.03

* cited by examiner

CYLINDER OPENING SIDE ←⎯⎯⎯⎯⎯→ CYLINDER BOTTOM SURFACE SIDE

BRAKE CONTROL DEVICE

This application claims priority under 35 U.S.C. 119 with respect to Japanese Application No. 2014-107921 filed in Japan on May 26, 2014, the entire content of which is herein incorporated by reference.

TECHNICAL FIELD

This invention relates to a brake control device which applies a target braking force to wheels of a vehicle.

BACKGROUND ART

Conventionally, a hydraulic pressure braking force generating device is known, which applies a hydraulic pressure braking force to a vehicle wheel corresponding to a wheel cylinder by supplying the wheel cylinder with an operating fluid from the master cylinder. Generally, when a hydraulic pressure in a wheel cylinder (referred to also as a "wheel pressure") increases, a brake pad corresponding to the wheel cylinder is brought into contact with a brake rotor and then the brake pad is pushed onto the brake rotor by the wheel pressure to perform an effective braking operation by the braking force. When the pressure is not generated in the wheel cylinder, the brake pad and the brake rotor are naturally separated from each other. Accordingly, until the brake pad is brought into contact with the brake rotor, the braking force is not effective to the brake performance in spite of the depression operation of the brake pedal by an operator of the vehicle. Accordingly, there is still a room for improving a responsiveness of braking force in braking operation in the conventional brake control device as explained above.

Therefore, in order to improve the responsiveness of the braking force, a pre-charge technology has been developed and proposed, for example, for a brake control device disclosed in JP 2004-161174 A (Patent Literature 1) in which a predetermined pressure is applied in the wheel cylinder in advance. According to this technology, by obtaining the wheel pressure using a pressure sensor, a predetermined pre-charged pressure has been generated in the wheel cylinder.

CITATION LIST

Patent Literature

Patent Literature 1: JP2004-161174 A

SUMMARY OF INVENTION

Technical Problem(s)

However, in the above conventional device which performs a pre-charging, a fixed or uniform pre-charging is performed by a predetermined controlling method. Therefore, there is still a room for improving a compartment comfortability for the occupant of the vehicle. The inventors of this application found the problem which had never been focused on and completed the invention which solved the problem.

Accordingly, this invention was made in consideration with the above-mentioned situation and the objective of the invention is to provide a brake control device which performs a pre-charging control for improving the comfortability for the occupant of the vehicle, yet keeping a necessary responsiveness for braking operation.

Solution to Problem(s)

The brake control device according to a first aspect of the invention applied to a hydraulic pressure braking force generating device equipped with a wheel cylinder which applies a braking force to a vehicle wheel, a master cylinder which outputs a master pressure to the wheel cylinder by driving a master piston by a servo pressure inputted to a servo chamber and a hydraulic pressure generating device which outputs a desired hydraulic pressure to the servo chamber. The brake control device includes a hydraulic pressure control portion which generates a preparatory hydraulic pressure in a pilot chamber when the hydraulic pressure generating device is equipped with the pilot chamber contributing to a generation of the servo pressure and which generates the preparatory hydraulic pressure in the servo chamber when the hydraulic pressure generating device is not equipped with the pilot chamber, a detecting portion which detects a vehicle state and a control mode selecting portion which selects a control mode based on a detection result of the detecting portion from a control mode group including at least two control modes which are a responsiveness priority mode which gives more priority to a responsiveness of the braking force relative to an operation of a brake operating member than to a suppression of an operating noise occurred upon the generation of the preparatory hydraulic pressure and a serenity priority mode which gives more priority to the suppression of the operating noise occurred upon the generation of the preparatory hydraulic pressure than to the responsiveness of the braking force and wherein the hydraulic pressure control portion controls the hydraulic pressure generating device to generate the preparatory hydraulic pressure in response to the control mode selected by the control mode selecting portion.

The vehicle state is considered to be an element for judgement how rapidly a braking force is necessary. The vehicle state includes a state of a vehicle per se and a state of operating the vehicle (operating intention of the operator of the vehicle). According to the first aspect of the invention above, by detecting the vehicle state, a preparatory hydraulic pressure generating method is selected in response to the detected vehicle state, in other words, a control mode being selected from either one of the responsiveness priority mode which gives priority to the responsiveness and the serenity priority mode which gives priority to the serenity. According to the first aspect of the invention, when the necessity of generating a braking force is high, the responsiveness is improved by selecting the responsiveness priority mode and when the necessity of generating a braking force is low, the suppression of serenity is given a priority by selecting the serenity priority mode. Thus, by generating a preparatory hydraulic pressure, the responsiveness can be secured and at the same time by selecting a control mode, the comfortability for the occupant of the vehicle can be improved.

The brake control device according to a second aspect of the invention is characterized in that in the feature of the first aspect, the hydraulic pressure generating device includes a mechanical pressure adjusting device which outputs the servo pressure to the servo chamber in response to the pilot pressure which has been inputted to the pilot chamber and a valve device which outputs the desired hydraulic pressure to the pilot chamber wherein the hydraulic pressure control portion includes a judging portion for judging whether or not a stroke of the brake operating member is equal to or less than a predetermined value and a pilot pressure control portion which generates the preparatory hydraulic pressure in the pilot chamber by controlling the valve device when the judging portion judges that the stroke of the brake operating member is equal to or less than the predetermined value.

According to the second aspect of the invention, the hydraulic pressure generating device is equipped with the pilot chamber and the preparatory hydraulic pressure is generated in the pilot chamber. This structure of the second aspect can also obtain the advantageous effects same as those obtained by the feature of the first aspect above. Further, by using the judging portion, a pre-charging can be surely executed at an early stage of operation of the brake operating member.

The brake control device according to a third aspect of the invention is characterized in that in the feature of the above first aspect or the second aspect of the invention, the serenity priority mode is set to a control mode in which a flow-rate of an operating fluid which generates the preparatory hydraulic pressure is lessened compared to the flow-rate of the operating fluid in the responsiveness priority mode and the detecting portion includes a first sensor which measures a value regarding to the stroke of the brake operating member and wherein the control mode selecting portion selects the control mode based on a change speed of the stroke based on a measured result of the first sensor when the stroke of the brake operating member is less than the predetermined value.

The change speed of the stroke is a measure for detecting the necessity of braking force. According to the third aspect of the invention, since the control mode is selected based on the change speed of the stroke, a proper and comfortability improved pre-charging control which the operator of the vehicle requires can be realized. In detail, the serenity priority mode is a control which lessens the flow-rate of the operating fluid and accordingly, by selecting this control mode, a noise which is generated when the operating fluid is flowing through the piping or flowing into a chamber with a small pressure can be minimized.

The brake control device according to a fourth aspect of the invention is characterized in that in any one of the above first through third aspects, the serenity priority mode is the control mode in which the flow-rate of the operating fluid which generates the preparatory hydraulic pressure is lessened compared to the flow-rate of the operating fluid in the responsiveness priority mode and the detecting portion includes a second sensor which measures a value regarding to a vehicle speed and wherein the control mode selecting portion selects the control mode based on a measured result of the second sensor.

The value regarding to the vehicle speed is an index to presume the state of a vehicle itself. For example, when the vehicle is running with a slower speed, the running noise is relatively small and the requirement of responsiveness for braking operation is relatively low. However, when the vehicle is running with a higher speed, the running noise is relatively high and the requirement of responsiveness for braking operation is relatively high. According to the fourth aspect of the invention above, since the control mode is selected based on the value regarding to the vehicle speed, in response to the vehicle state, a proper and comfortability improved pre-charging control can be realized.

The brake control device according to a fifth aspect of the invention is characterized in that in any one of the first through fourth aspects, the serenity priority mode is the control mode in which the flow-rate of the operating fluid which generates the preparatory hydraulic pressure is lessened compared to the flow-rate of the operating fluid in the responsiveness priority mode and the detecting portion includes a third sensor which detects at least one particular operation among a door unlocking operation, an ignition "ON" operation and an occupant seating operation, which are defined as particular operations, and wherein the control mode selecting portion selects the serenity priority mode as the control mode when the third sensor detects the at least one particular operation.

In most cases, the above particular operations are performed immediately before the operator of the vehicle operates the vehicle. Accordingly, the particular operation means the operation by the operator for starting driving of the vehicle. According to the fifth aspect of the invention above, by detecting the particular operation, the preparatory hydraulic pressure can be generated in advance, quietly by the serenity priority mode. Thus, the operating noise upon braking operation by the operator of the vehicle before the driving of the vehicle can be minimized.

The brake control device according to a sixth aspect of the invention is characterized in that in the first or the second aspect, the serenity priority mode is the mode for maintaining the preparatory hydraulic pressure and the detecting portion includes a first sensor which measures a value regarding to the stroke of the brake operating member and wherein the control mode selecting portion judges whether or not a stroke of the brake operating member is decreasing based on a measured result of the first sensor and selects the serenity priority mode based on a judgment that the stroke is decreasing and is decreased to the predetermined value.

The brake control device according to the seventh aspect of the invention is characterized in that in any one of the first through fifth aspects, the control mode group includes a second serenity priority mode wherein the preparatory hydraulic pressure is maintained and the detecting portion includes a first sensor which measures a value regarding to a stroke of the brake operating member and wherein the control mode selecting portion judges whether or not the stroke of the brake operating member is decreasing based on a measured result of the first sensor and selects the second serenity priority mode based on a judgment that the stroke is decreasing and is decreased to the predetermined value.

According to the sixth and seventh aspects of the invention, after the vehicle is stopped by the depression of the brake operating member, and during the release of the brake operating member by the operator of the vehicle, the control mode selecting portion recognizes that the stroke is decreasing and that the stroke is decreased to a predetermined amount and accordingly the preparatory hydraulic pressure is maintained even after the stroke decreased to the predetermined amount or less than that. In other words, even after the foot of the operator is released from the brake operating member, the pre-charging state continues. Thus, for example, after the operator of the vehicle shifted a shift lever to a parking position and released the foot from the brake operating member, if the operator depresses the brake operating member again, the preparatory hydraulic pressure is kept without generating an operating noise due to the maintained preparatory hydraulic pressure. Thus the conformability for the operator can be improved.

The brake control device according to an eighth aspect of the invention is characterized in that in any one of the first through seventh aspects of the invention, the preparatory hydraulic pressure is set to a value so that the hydraulic pressure in the wheel cylinder is kept to be substantially the atmospheric pressure. According to this structure, a dragging (unnecessary braking force) phenomenon derived from a displacement of the brake pad can be prevented.

The brake control device according to a ninth aspect of the invention is characterized in that in the eighth aspect of the invention, the preparatory hydraulic pressure is set to a value so that the servo pressure does not change or becomes equal to or less than a set load of a biasing member which biases the master piston towards an initial position when the hydraulic pressure generating device is equipped with the pilot chamber and wherein the preparatory hydraulic pressure is set to a value so that the servo pressure becomes equal to or less than the set load of the biasing member which biases the master piston towards the initial position when the hydraulic pressure generating device is not equipped with the pilot chamber.

According to this structure, the master piston is not driven and the generation of the master pressure (pressure in the master cylinder), and accordingly, the generation of the wheel pressure (pressure in the wheel cylinder) are prevented. Accordingly, the wheel pressure surely becomes the atmospheric pressure to suppress the generation of the dragging phenomenon.

The brake control device according to a tenth aspect of the invention is characterized in that in the second aspect of the invention, the pilot pressure control portion supplies the pilot chamber with a predetermined amount of the operating fluid corresponding to the preparatory hydraulic pressure by controlling the valve device.

According to this structure, since the amount of operating fluid necessary to have the hydraulic pressure in the pilot chamber be the preparatory hydraulic pressure can be pre-set in advance, control for supplying the necessary amount of the operating fluid can be set in advance and therefore, detections of the wheel pressure, the servo pressure and the pilot pressure are not necessary. In other words, according to the tenth aspect of the invention, there needs no pressure monitoring by the pressure sensor or other sensors and a simple control can be realized.

The brake control device according to an eleventh aspect of the invention is characterized in that in any one of the first through seventh aspects of the invention, the brake control device includes a master pressure detecting portion for detecting the master pressure which is a hydraulic pressure in the master cylinder, wherein the hydraulic pressure control portion generates the preparatory hydraulic pressure so that the braking force to be applied to the vehicle wheel by the wheel cylinder becomes equal to or less than a predetermined braking force based on a detected result of the master pressure detecting portion.

According to the structure above, an ineffective or idle stroke in the wheel cylinder (for example, a separation distance between the brake pad and the brake rotor) can be shortened by the preparatory hydraulic pressure thereby to further improve the responsiveness. The above predetermined braking force may be set to zero (0) and by the preparatory hydraulic pressure, the separation distance may be shortened to a distance immediately before the contact between the brake pad and the brake rotor.

The brake control device according to a twelfth aspect of the invention is characterized in that a brake control device applied to a hydraulic pressure braking force generating device equipped with a wheel cylinder which applies a braking force to a vehicle wheel, a master cylinder which outputs a master pressure to the wheel cylinder by driving a master piston by a servo pressure inputted to a servo chamber, a mechanical pressure adjusting device which outputs the servo pressure to the servo chamber in response to the pilot pressure which has been inputted to the pilot chamber and a valve device which outputs a desired hydraulic pressure to the pilot chamber, wherein the brake control device includes a first sensor which detects a stroke of a brake operating member, a judging portion for judging whether or not the stroke of the brake operating member is within a predetermined range, a change speed calculating portion for calculating a value regarding to a change speed of the stroke within the predetermined range, a pilot pressure control portion which generates the preparatory hydraulic pressure in the pilot chamber by controlling the valve device when the judging portion judges that the stroke of the brake operating member is within the predetermined range and a control mode selecting portion which memorizes a control mode group including a plurality of control modes for generating the preparatory hydraulic pressure and which selects one control mode from the control mode group based on a calculated result of the change speed calculating portion, wherein the pilot pressure control portion controls the valve device in response to the control mode selected by the control mode selecting portion thereby to generate the preparatory hydraulic pressure in the pilot chamber.

According to the structure above, a pre-charging control mode is selected based on the change speed of the stroke of the brake operating member and the pre-charging is executed in the selected control mode when the stroke is within the predetermined range. According to the twelfth aspect of the invention, the inventors focused on the change speed of the stroke which directly represents the intention of the operator of the vehicle and by selecting a pre-charging control mode from the plurality of control modes based on the change speed of the stroke, a pre-charging control can be realized corresponding to the intention of the operator of the vehicle. In other words, the comfortability for the operator of the vehicle can be improved.

BRIEF EXPLANATION OF ATTACHED DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

EMBODIMENTS FOR IMPLEMENTING INVENTION

Figure 1:
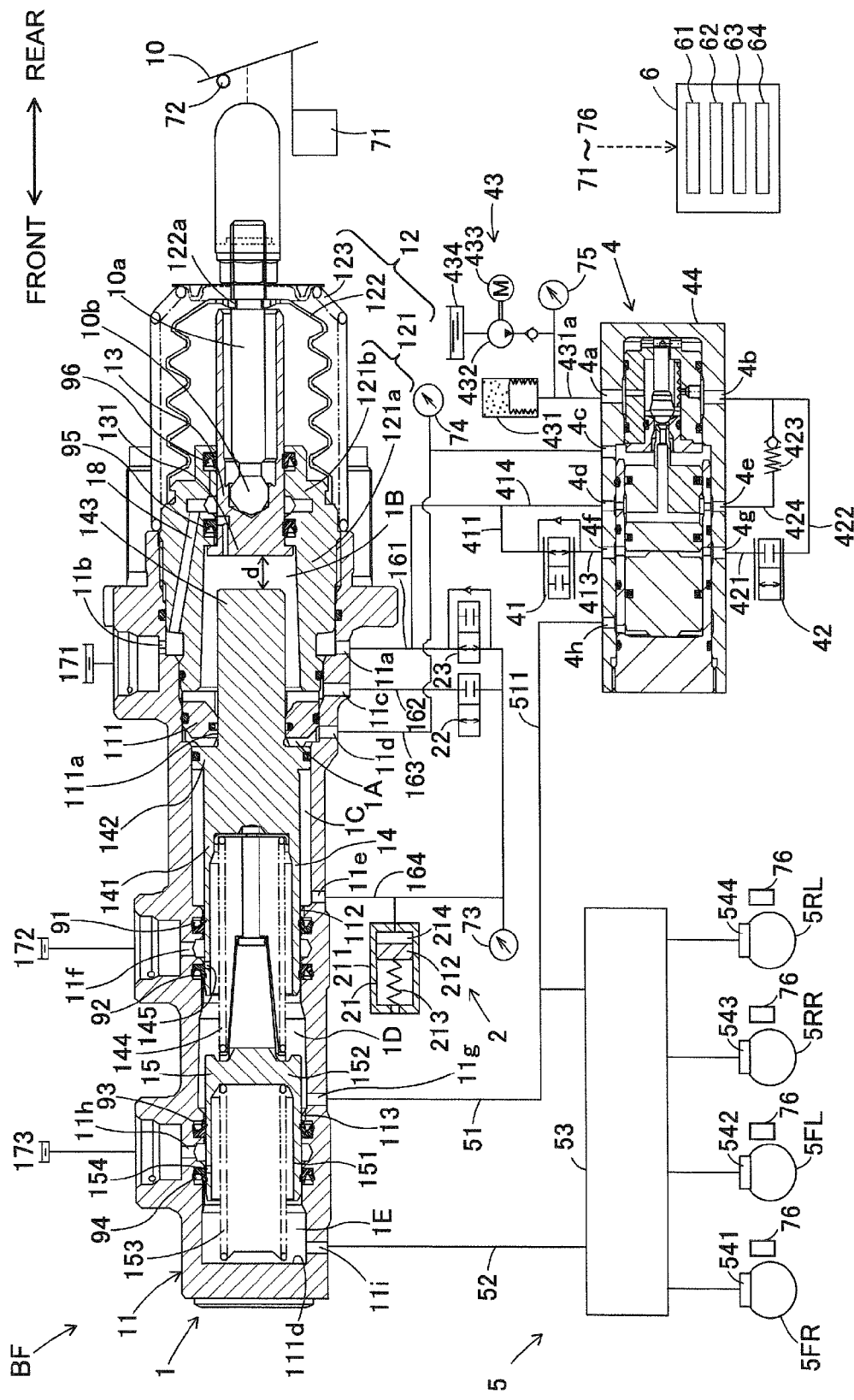
FIG. 1 is a structural view showing a structure of the vehicle brake device according to a first embodiment of the invention.

The brake device according to the embodiments of the invention will be explained hereinafter with reference to the attached drawings. It is noted that the same or equivalent components or parts are referenced with the same symbols or the numerals and the shape and the size of each component in the drawings, by which the structural explanation thereof will be made, are not necessarily accurate to the actual product.

First Embodiment

As shown in FIG. 1, the brake device is formed by a hydraulic pressure braking force generating device BF which generates the hydraulic pressure braking force and applies the hydraulic pressure braking force to the vehicle wheels 5FR, 5FL, 5RR and 5RL and a brake ECU 6 (corresponding to the brake control device) which controls the hydraulic pressure braking force generating device BF.

(Hydraulic Pressure Braking Force Generating Device BF)

The hydraulic pressure braking force generating device BF is formed by a master cylinder 1, a reaction force generating device 2, a first control valve 22, a second control valve 23, and a servo pressure generating device 4 (corresponding to the hydraulic pressure generating device), a hydraulic pressure control portion 5 and various sensors 71 through 76.

(Master Cylinder 1)

The master cylinder 1 is a portion which supplies the hydraulic pressure control portion 5 with the operating fluid in response to the operating amount of a brake pedal 10 (corresponding to the brake operating member) and is formed mainly by a main cylinder 11, a cover cylinder 12, an input piston 13, a first master piston 14 and a second master piston 15. The brake pedal 10 may be any type of brake operating portion by which an operator of the vehicle can perform braking operation. It is noted that one single master piston may be used instead of two.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof. The main cylinder 11 is provided therein at portions closer to the front end than the inner wall portion 111 with a small diameter portion 112 (rear) and a small diameter portion 113 (front), each of which inner diameter is set to be somewhat smaller than the inner diameter of the inner wall portion 111. In other words, the small diameter portions 112, 113 project from the inner circumferential surface of the main cylinder 11 having an inwardly annularly shaped profile. The first master piston 14 is provided inside the main cylinder 11 and is slidably movable along the small diameter portion 112 in the axial direction. Similarly, the second master piston 15 is provided inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b is formed to be smaller than an inner diameter of the front portion 121a.

The boots 122 is of tubular bellow shaped and is used for dust prevention purpose and is extendible or compressible in front and rearward directions. The front side of the boots 122 is assembled to be in contact with the rear end opening of the cylindrical portion 121. A through hole 122a is formed at a central portion of the rear of the boots 122. The compression spring 123 is a coiled type biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical portion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably and fluid-tightly in contact with the through hole 111a of the inner wall portion 111. The rear end of the projection portion 143 projects into the inner space of the cylindrical portion 121 passing through the through hole 111a and is separated from the inner peripheral surface of the cylindrical portion 121. The rear end surface of the projection portion 143 is separated from the bottom wall 131 of the input piston 13 and the separation distance "d" is formed to be variable.

It is noted here that a "first master chamber 1D" is defined by the inner peripheral surface of the main cylinder 11, a front side of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, the small diameter portion 112, a front surface of the flange portion 142 and the outer peripheral surface of the first master piston 14. The flange portion 142 of the first master piston 14 separates the rear chamber into a front portion and a rear portion and the front portion is defined to be a "second hydraulic pressure chamber 1C" and the rear portion is defined to be a "servo chamber 1A". A "first hydraulic pressure chamber 1B" is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 13.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. "A second master chamber 1E" is defined by the inner peripheral surface and the inner bottom surface 111d of the main cylinder 11 and the pressurizing cylindrical portion 151 of the second master piston 15.

Ports 11a to 11i, which connect the inside and the outside of the master cylinder 1, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11a and the port 11b are in communication through an annular clearance formed between the inner circumferential surface of the main cylinder 11 and the outer circumferential surface of the cylindrical portion 121. The port 11a and the port 11b are connected to a conduit 161 and also connected to a reservoir 171.

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the inner wall portion 111 and at the same time forward of the port 11c and the port 11d connects the servo chamber 1A with a conduit 163. The port 11e is formed at a location forward of the port 11d and connects the second hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

A sealing member, such as an O-ring and the like (see black dot in the drawings) is appropriately provided within the master cylinder 1. The sealing members 91, 92 are provided at the small diameter portion 112 and in liquid-tightly contact with the outer circumferential surface of the first master piston 14. Similarly, the sealing members 93, 94 are provided at the small diameter portion 113 and in liquid-tightly contact with the outer circumferential surface of the second master piston 15. Additionally, sealing members 95, 96 are provided between the input piston 13 and the cylindrical portion 121.

The stroke sensor 71 (corresponding to the "detecting portion" and the "first sensor") is a sensor which detects the operating amount (stroke) of the operation of the brake pedal 10 by a driver (operator) of the vehicle and transmits the detected result to the brake ECU 6. A brake stop switch 72 is a switch which detects whether the brake pedal 10 is depressed or not by using two signals (ON & OFF) and the detected signals are sent to the brake ECU 6. It may be possible to use an operating force sensor which detects an operating force (depression force) in response to the operation of the brake pedal 10 by the operator, instead of using the stroke sensor 71.

(Reaction Force Generating Device 2)

The reaction force generating device 2 is a device which generates a reaction force against the operation force when the brake pedal 10 is depressed and is formed by mainly a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein and a reaction force hydraulic pressure chamber 214 is formed at a location backward of the piston 212. The piston 212 is biased in the backward direction by a compression spring 213. The reaction force hydraulic pressure chamber 214 is connected to the second hydraulic pressure chamber 1C via a conduit 164 and the port 11e, and is connected further to the first control valve 22 and the second control valve 23 via the conduit 164.

(First Control Valve 22)

The first control valve 22 is an electromagnetic valve which is structured to close under non-energized state and opening and closing thereof is controlled by the brake ECU 6. The first control valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c. The first hydraulic pressure chamber 1B becomes in open state when the first control valve 22 opens and becomes in closed state when the first control valve 22 closes. Accordingly, the conduits 164 and 162 are formed for establishing fluid communication between the first hydraulic pressure chamber 1B and the second hydraulic pressure chamber 1C.

The first control valve 22 is closed under non-energized state and under this state communication between the first hydraulic pressure chamber 1B and the second hydraulic pressure chamber 1C is interrupted. Due to the closure of the first hydraulic pressure chamber 1B, the operating fluid is nowhere to flow and the input piston 13 and the first master piston 14 are moved integrally keeping the separation distance "d" therebetween to be constant. The first control valve 22 is open under the energized state and under such state, the communication between the first hydraulic pressure chamber 1B and the second hydraulic pressure chamber 1C is established. Thus, the volume change in the first hydraulic pressure chamber 1B and the second hydraulic pressure chamber 1C due to the advancement and retreatment of the first master piston 14 can be absorbed by the transferring of the operating fluid.

The pressure sensor 73 is a sensor which detects the reaction force hydraulic pressure of the second hydraulic pressure chamber 1C and the first hydraulic pressure chamber 1B and is connected to the conduit 164. The pressure sensor 73 detects the pressure of the second hydraulic pressure chamber 1C while the first control valve 22 is in a closed state. On the other hand, while the first control valve 22 is in an open state, the pressure sensor 73 also detects the pressure (or the reaction force hydraulic pressure) in the hydraulically connected first hydraulic pressure chamber 1B. The pressure sensor 73 sends the detected signal to the brake ECU 6.

(Second Control Valve 23)

The second control valve 23 is an electromagnetic valve which is structured to open under a non-energized state and the opening and closing thereof is controlled by the brake ECU 6. The second control valve 23 is disposed between the conduit 164 and the conduit 161 for establishing communication therebetween. The conduit 164 is in communication with the second hydraulic pressure chamber 1C via the port 11e and the conduit 161 is in communication with the reservoir 171 via the port 11a. Accordingly, the second control valve 23 establishes communication between the second hydraulic pressure chamber 1C and the reservoir 171 under the non-energized state not to generate any reaction force hydraulic pressure but interrupts the communication therebetween to generate the reaction force hydraulic pressure under the energized state.

(Servo Pressure generating Device 4)

The servo pressure generating device 4 is a device which generates a servo pressure and includes a pressure decreasing valve 41 (corresponding to the valve device), a pressure increasing valve 42 (corresponding to the valve device), a pressure supplying portion 43 and a regulator 44 and so on. The pressure decreasing valve 41 is a valve which opens under non-energized state and the flow-rate thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 (low pressure source) via the conduits 411, 161 and ports 11a and 11b. It is noted here that the conduit 411 may be connected to a reservoir 434 (later described) instead of being connected to the reservoir 171. In such case the low pressure source corresponds to the reservoir 434. The reservoir 171 and the reservoir 434 may be formed to be a common reservoir.

The pressure increasing valve 42 is a valve which closes under a non-energized state and the flow-rate of the pressure increasing valve 42 is controlled by the brake ECU 6. One end of the pressure increasing valve 42 is connected to the conduit 421 and the other end thereof is connected to the conduit 422. Both pressure decreasing and increasing valves 41 and 42 correspond to a pilot hydraulic pressure generating device.

The pressure supplying portion 43 is a portion for supplying the regulator 44 with a highly pressurized operating fluid. The pressure supplying portion 43 includes an accumulator (high pressure source) 431, a hydraulic pressure pump 432, a motor 433 and the reservoir 434 and so on.

The accumulator 431 is a tank in which a highly pressurized operating fluid is accumulated and is connected to the regulator 44 and the hydraulic pressure pump 432 via a conduit 431a. The hydraulic pressure pump 432 is driven by the motor 433 and supplies the pressurized operating fluid to the accumulator 431, the operating fluid being accumulated in the reservoir 434. The pressure sensor 75 provided in the conduit 431a detects the accumulator hydraulic pressure in the accumulator 431 and the detected signal is sent to the brake ECU 6. The accumulator hydraulic pressure correlates with the accumulated operating fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 supplies the pressurized operating fluid to the accumulator 431 in order to recover a pressure up to the value equal to or more than the predetermined value.

Figure 2:
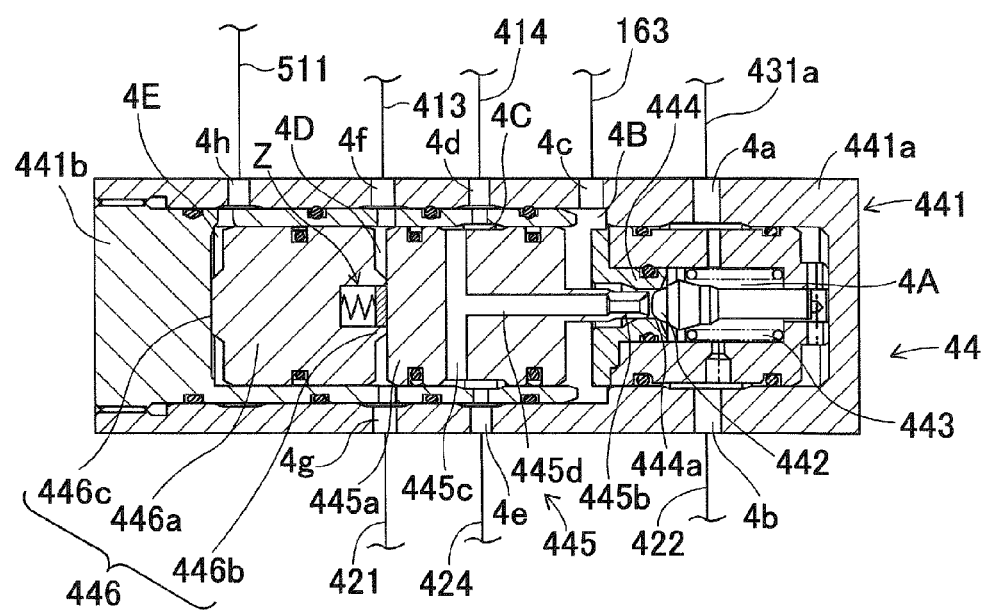
FIG. 2 is a cross sectional view of a regulator showing a detail structure thereof according to the first embodiment.

FIG. 2 is a partial cross sectional view illustrating a configuration of the inside of the regulator (corresponding to the pressure adjusting device) 44 forming the servo pressure generating device 4. As shown in the drawing, the regulator 44 (corresponds to the pressure adjusting device) includes a cylinder 441, a ball valve 442, a biasing portion 443, a valve seat portion 444, a control piston 445, a sub-piston 446 and so forth.

The cylinder 441 includes a cylinder case 441a formed in a substantially bottomed cylinder-shape having a bottom surface at one end thereof (at the right side in FIG. 2) and a cover member 441b closing an opening of the cylinder case 441a (at the left side thereof in FIG. 2). The cylinder case 441a is provided with a plurality of ports 4a through 4h through which the inside and the outside of the cylinder case 441a are in communication. The cover member 441b is formed to be in a substantially bottomed cylinder-shape and a plurality of ports is provided at each portion on the cylindrical portion facing to the corresponding ports 4d through 4h of the cylinder case 441a.

The port 4a is connected to the conduit 431a. The port 4b is connected to the conduit 422. The port 4c is connected to a conduit 163. The conduit 163 connects the servo chamber 1A and the outlet port 4c. The port 4d is connected to the conduit 161 via the conduit 414. The port 4e is connected to the conduit 424 and further connected to the conduit 422 via a relief valve 423. The port 4f is connected to the conduit 413. The port 4g is connected to the conduit 421. The port 4h is connected to a conduit 511, which is branched from the conduit 51.

The ball valve 442 is a valve having a ball shape and is arranged at the bottom surface side (which will be hereinafter referred to also as a cylinder bottom surface side) of the cylinder case 441a inside of the cylinder 441. The biasing portion 443 is formed by a spring member biasing the ball valve 442 towards the opening side (which will be hereinafter referred to also as a cylinder opening side) of the cylinder case 441a, and is provided at the bottom surface of the cylinder case 441a. The valve seat portion 444 is a wall member provided at the inner peripheral surface of the cylinder case 441a and divides the cylinder into the cylinder opening side and the cylinder bottom surface side. A through passage 444a through which the divided cylinder opening side and the cylinder bottom surface side are in communication is formed at a center of the valve seat portion 444. The valve seat portion 444 supports the ball valve 442 from the cylinder opening side by closing the through passage 444a by the biased ball valve 442. A valve seat surface 444b is formed at the opening portion of the cylinder bottom surface side of the through passage 444a such that the ball valve 442 is separated from or seated on (brought into contact with) a valve seat surface 444b.

A space defined by the ball valve 442, the valve seat portion 444 and the inner circumferential surface of the cylinder case 441a at the cylinder bottom surface side is referred to as "a first chamber 4A". The first chamber 4A is filled with the operating fluid and is connected to the conduit 431a via the port 4a and to the conduit 422 via the port 4b.

The control piston 445 includes a main body portion 445a formed in a substantially columnar shape and a projection portion 445b formed in a substantially columnar shape having a smaller diameter than the main body portion 445a. The main body portion 445a is arranged in the cylinder 441 in a coaxial and liquid-tight manner on the cylinder opening side of the valve seat portion 444, the main body portion 445a being slidably movable in the axial direction. The main body portion 445a is biased towards the cylinder opening side by means of a biasing member (not shown). A passage 445c is formed at a substantially intermediate portion of the main body portion 445a in a cylinder axis direction. The passage 445c extends in the radial direction (in an up-and-down direction as viewed in FIG. 2) and both end portions thereof open at a circumferential surface of the main body portion 445a. A portion of an inner circumferential surface of the cylinder 441 corresponding to an opening position of the passage 445c is provided with the port 4d and is formed to be recessed, which recessed space portion forms a "third chamber 4C".

The projection portion 445b projects towards the cylinder bottom surface side from a center portion of an and surface of the cylinder bottom surface side of the main body portion 445a. The projection portion 445b is formed so that the diameter thereof is smaller than the diameter of the through passage 444a of the valve seat portion 444. The projection portion 445b is coaxially provided relative to the through passage 444a. A tip end of the projection portion 445b is spaced apart from the ball valve 442 towards the cylinder opening side by a predetermined distance. A passage 445d is formed at the projection portion 445b so that the passage 445d extends in the cylinder axis direction and opens at a center portion of an end surface of the projection portion 445b. The passage 445d extends up to the inside of the main body portion 445a and is connected to the passage 445c.

A space defined by the end surface of the cylinder bottom surface side of the main body portion 445a, an outer surface of the projection portion 445b, the inner circumferential surface of the cylinder 441, the valve seat portion 444 and the ball valve 442 is referred to as a "second chamber 4B". The second chamber 4B is in communication with the ports 4d and 4e via the passages 445d and 445c and the third chamber 4C under the state that the projection portion 445b and the ball valve 442 is not contact with each other.

The sub-piston 446 includes a sub main body portion 446a, a first projection portion 446b and a second projection portion 446c. The sub main body portion 446a is formed in a substantially columnar shape. The sub main body portion 446a is arranged within the cylinder 441 in a coaxial and liquid-tight manner on the cylinder opening side of the main body portion 445a the sub main body portion 446a being slidably movable in the axial direction.

The first projection portion 446b is formed in a substantially columnar shape having a smaller diameter than the sub main body portion 446a and projects from a center portion of an end surface of the cylinder bottom surface side of the sub main body portion 446a. The first projection portion 446b is in contact with the end surface of the cylinder bottom surface side of the sub main body portion 446a. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the end surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D" (corresponding to the "pilot chamber"). The first pilot chamber 4D is in communication with the pressure decreasing valve 41 via the port 4f and the conduit 413 and is in communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the operating fluid. The pressure sensor 74 is a sensor that detects the servo pressure to be supplied to the servo chamber 1A and is connected to the conduit 163 as shown in FIG. 1. The pressure sensor 74 sends the detected signal to the brake ECU 6.

Thus, the regulator 44 includes the control piston 445 which is driven by the force differential between a force corresponding to the pressure in the first pilot chamber 4D (referred to also as "pilot pressure") and a force corresponding to the servo pressure. When the fluid amount flowing into or out from the first pilot chamber 4D increases, the displacement amount of the control piston 445 from the reference position where the force corresponding to the pilot pressure and the force corresponding to the servo pressure are balanced increases and accordingly, the fluid amount flowing into or out from the servo chamber 1A increases.

The regulator 44 is structured such that the more the fluid amount flowing into the first pilot chamber 4D from the accumulator 431 increases, the more the volume of the first pilot chamber 4D increases and accordingly, the more the fluid amount flowing into the servo chamber 1A from the accumulator 431 increases and such that more the fluid amount flowing out of the first pilot chamber 4D into the reservoir 171 increases, the less the volume of the first pilot chamber 1D decreases and accordingly, the more the fluid amount flowing into the reservoir 171 out of the servo chamber 1A increases.

It is noted that a damper device "Z" is provided at a wall portion of the sub-piton 446 facing to the first pilot chamber 4D. The damper device "Z" is structured like a stroke simulator and includes a piston portion being biased towards the first pilot chamber 4D by a biasing member. The rigidity of the first pilot chamber 4D is set by providing the damper device "Z".

(Hydraulic Pressure Control Portion 5)

The first and the second master chambers 1D and 1E which generate the master cylinder hydraulic pressure (master pressure) are connected to the wheel cylinders 541 through 544 via the conduits 51 and 52 and ABS 53 (Anti-lock Brake System). The wheel cylinders 541 through 544 form parts of the brake devices for the vehicle wheels 5FR through 5RL. In more specifically, the port 11g of the first master chamber 1D and the port 11i of the second master chamber 1E are connected to the well-known ABS 53 via the conduits 51 and 52, respectively. The ABS 53 is connected to the wheel cylinders 541 through 544 which operate the brake devices for braking the wheels 5FR through 5RL.

The ABS 53 includes a vehicle wheel speed sensor 76 (corresponding to the "detecting portion" and the "second sensor") installed at each vehicle wheel 5FR through 5RL for detecting the wheel speed of each vehicle wheel. The detection signal which indicates the wheel speed of the vehicle wheel detected by the vehicle wheel speed sensor 76 is outputted to the brake ECU 6.

By thus structured ABS 53, the brake ECU 6 executes an ABS control (Antilock Brake Control) by controlling the opening/closing change over operation of the holding valves and the pressure decreasing valves based on the master pressure, the state of the vehicle wheel speed and the front/rear acceleration and operating the motor when necessary, to adjust brake hydraulic pressure to the wheel cylinders 541 through 544, i.e., to adjust braking force to each of the vehicle wheels 5FR through 5RL. The ABS 53 is a device which supplies the wheel cylinders 541 through 544 with operating fluid supplied from the master cylinder 1 adjusting the amount of the fluid and the timing of supply based on the instructions by the brake ECU 6.

According to the brake control, which will be explained later, the hydraulic pressure supplied from the accumulator 431 of the servo pressure generating device 4 is controlled by the pressure increasing valve 42 and the pressure decreasing valve 41 to thereby generate the servo pressure in the servo chamber 1A. Thus, the first and the second master pistons 14 and 15 are advanced to pressurize the fluid in the first and the second master chambers 1D and 1E. The hydraulic pressures in the first and the second master chambers 1D and 1E are supplied to the wheel cylinders 541 through 544 as the master pressure from the respective ports 11g and 11i via the respective conduits 51 and 52 and the ABS 53. Thus, the hydraulic pressure braking force is applied to the vehicle wheels 4FR through 5RL.

(Brake ECU 6)

The brake ECU 6 is an electronic control unit and includes a microprocessor. The microprocessor includes an input/output interface, CPU, RAM, ROM and a memory portion such as non: volatile memory, connected with one another through bus communication.

The brake ECU 6 is connected to the various sensors 71 through 76 for controlling the electromagnetic valves 22, 23, 41 and 42 and the motor 433. The operating amount (stroke) of brake pedal 10 operated by the operator of the vehicle is inputted to the brake ECU 6 from the stroke sensor 71. A signal indicating whether or not the operation of the brake pedal 10 by the operator of the vehicle is performed is inputted to the brake ECU 6 from the brake stop switch 72. The reaction force hydraulic pressure of the second hydraulic pressure chamber 1C or the pressure of the first hydraulic pressure chamber 1B (or the reaction force hydraulic pressure) is inputted to the brake ECU 6 from the pressure sensor 73. The servo pressure supplied to the servo chamber 1A is inputted to the brake ECU 6 from the pressure sensor 74. The accumulator hydraulic pressure of the accumulator 431 is inputted to the brake ECU 6 from the pressure sensor 75 and the wheel speeds of the vehicle wheels 5FR through 5RL are inputted to the brake ECU 6 from the vehicle wheel speed sensors 76.

(Brake Control)

The brake control by the brake ECU 6 will be explained hereinafter. The brake control means a normal brake control. In other words, the brake ECU 6 energizes the first control valve 22 and opens the first control valve 22 and energizes the second control valve 23 and closes the second control valve 23. By this closing of the second control valve 23, the communication between the second hydraulic pressure chamber 1C and the reservoir 171 is interrupted and by the opening of the first control valve 22, the communication between the first and the second hydraulic pressure chambers 1B and 1C is established. Thus, in the brake control, the servo pressure in the servo chamber 1A is controlled by controlling the pressure decreasing valve 41 and the pressure increasing valve 42 under the state that the first control valve 22 is open and the second control valve 23 is closed. The pressure decreasing valve 41 and the pressure increasing valve 42 may be referred to as a valve device which adjusts the flow amount of the operating fluid flowing into or out of the first pilot chamber 1D. In this brake control, the brake ECU 6 calculates the "required braking force" of the operator of the vehicle based on the operating amount of the brake pedal 10 (displacement amount of the input piston 13) detected by the stroke sensor 71 or the operating force of the brake pedal 10 by the operator of the vehicle. Thus the target servo pressure is set and the pressure decreasing valve 41 and the pressure increasing valve 42 are controlled such that the actual servo pressure is approximated to the target servo pressure.

In more detail, under the state that the brake pedal 10 is not depressed, the state is as explained above, that is the state that the ball valve 442 keeps the through passage 444*a* of the valve seat 444 to be closed. Further, the pressure decreasing valve 41 is in an open state and the pressure increasing valve 42 is in a closed state under the brake pedal 10 being not depressed. This means that the first chamber 4A and the second chamber 4B are hydraulically separated from each other.

The second chamber 4B is in communication with the servo chamber 1A via the conduit 163 to keep the hydraulic pressures in the two chambers 4B and 1A being mutually at an equal level. The second chamber 4B is in communication with the third chamber 4C via the passages 445*c* and 445*d* of the control piston 445 and accordingly, the second chamber 4B and the third chamber 4C are in communication with the reservoir 171 via the conduits 414 and 161. One side of the first pilot chamber 4D is closed by the pressure increasing valve 42, while the other side thereof is connected to the reservoir 171 through the pressure decreasing valve 41. The pressure in the first pilot chamber 4D and the pressure in the second chamber 4B are kept at the equal level. The second pilot chamber 4E is in communication with the first master chamber 1D via the conduits 511 and 51 thereby keeping the pressures of the two chambers 4E and 1D mutually equal to each other.

Under this state, when the brake pedal 10 is depressed, the brake ECU 6 controls the pressure decreasing valve 41 and the pressure increasing valve 42 based on the target friction braking force, specifically based on the target servo pressure. In other words, the brake ECU 6 controls so as to make the pressure decreasing valve 41 close more and to make the pressure increasing valve 42 open more.

The communication between the accumulator 431 and the first pilot chamber 4D is established by the opening of the pressure increasing valve 42 and the communication between the first pilot chamber 4D and the reservoir 171 is interrupted by the closing of the pressure decreasing valve 41. The pressure in the first pilot chamber 4D can be increased by the highly pressurized operating fluid supplied from the accumulator 431. The control piston 445 is slidably moved towards the cylinder bottom surface side by the increase of the pressure in the first pilot chamber 4D. Thus the tip end of the projection portion 445*b* of the control piston 445 is brought into contact with the ball valve 442 to close the passage 445*d* by the ball valve 442 thereby interrupting the communication between the second chamber 4B and the reservoir 171.

By further sliding movement of the control piston 445 towards the cylinder bottom surface side, the ball valve 442 is pushed towards the cylinder bottom surface side by the projection portion 445*b* to thereby separate the ball valve 442 from the valve seat surface 444*b*. This will allow establishment of fluid communication between the first chamber 4A and the second chamber 4B through the through passage 444*a* of the valve seat portion 444. As the highly pressurized operating fluid is supplied to the first chamber 4A from the accumulator 431, the hydraulic pressure in the second chamber 4B is also increased by the communication therebetween. As the separation distance between the ball valve 442 and the valve seat surface 444*b* becomes great, the fluid passage for the operating fluid becomes large and the pressure in the fluid passage downstream of the ball valve 442 becomes high. In other words, the larger the pressure (pilot pressure) in the first pilot chamber 4D, the longer the moving distance of the control piston 445 becomes and accordingly, the separation distance between the ball valve 442 and the valve seat surface 444*b* becomes large to thereby increase the hydraulic pressure (servo pressure) in the second chamber 4B.

The brake ECU 6 controls the pressure increasing valve 42 and the pressure decreasing valve 41 such that the more the displacement amount of the input piston 13 (operating amount of the brake pedal 10) detected by the stroke sensor 71 increases, the higher the pilot pressure in the first pilot chamber 4D becomes. In other words, the more the displacement amount of the input piston 13 (operating amount of the brake pedal 10), the higher the pilot pressure becomes and accordingly the servo pressure becomes higher as well. The servo pressure can be obtained by the pressure sensor 74 and can be converted into the pilot pressure.

Responding to the increase of the pressure in the second chamber 4B, the pressure in the servo chamber 1A which is in communication with the second chamber 4B increases. By the increase of the pressure in the servo chamber 1A, the first master piston 14 advances and then the pressure in the first master chamber 1D increases. Then, the second master piston 15 also advances and the pressure in the second master chamber 1E increases. By the increase of the pressure in the first master chamber 1D, highly pressurized brake fluid is supplied to the later explained ABS 53 and the second pilot chamber 4E. Although the pressure in the second pilot chamber 4E increases, since the pressure in the first pilot chamber 4D is also increased, the sub-piston 446 does not move. Thus, the highly pressurized operating fluid (master pressure) is supplied to the ABS 53 and the friction brake device is operated thereby to apply braking force to the vehicle. The force which advances the first master piston 14 in the "brake control" corresponds to the servo pressure.

When the braking operation is released, the pressure decreasing valve 41 is opened and the pressure increasing valve 42 is closed to establish the communication between the reservoir 171 and the first pilot chamber 4D. Accordingly, the control piston 445 is retreated and it returns to the state before the depression of the brake pedal 10.

According to the brake control of this embodiment, the target servo pressure is set in response to the operation and the stroke of the brake pedal and the pressure decreasing and the increasing valves 41 and 42 are controlled to change the pilot pressure so that the servo pressure reaches to the target servo pressure. The target servo pressure is set according to a map or the like. According to this embodiment, an electromagnetic valve is used for the pressure decreasing valve 41 and the pressure increasing valve 42, the valve opening current of which is varied in response to the pressure differential between one side port and the other side port of the valve.

(Pre-Charge Control)

The brake ECU 6 executes a "pre-charge control" which generates a preparatory hydraulic pressure in the first pilot chamber 4D under certain conditions. The preparatory hydraulic pressure according to the embodiment is set to a value so that the servo pressure (exactly, the axial force generated by the servo pressure acting on the first master piston 14) becomes equal to or less than a set load of a biasing member 144 which biases the first master piston 14 towards an initial position thereof. The brake ECU 6 controls the pressure decreasing valve 41 and the pressure increasing valve 42 to generate the preparatory hydraulic pressure (the value that the servo pressure becomes equal to or less than the set load) in the first pilot chamber 4D based on a predetermined target pilot pressure and a control current value which achieves the target pilot pressure or a measured value measured by the pressure sensor 74.

It is noted here that the brake ECU 6 as a function includes a first stroke judging portion 61 (corresponding to the judging portion), a second stroke judging portion 62 (corresponding to the judging portion), a pilot pressure control portion 63 (corresponding to the pilot pressure control portion) which executes the brake control and a control mode selecting portion 64 (corresponding to the control mode selecting portion).

Figure 3:
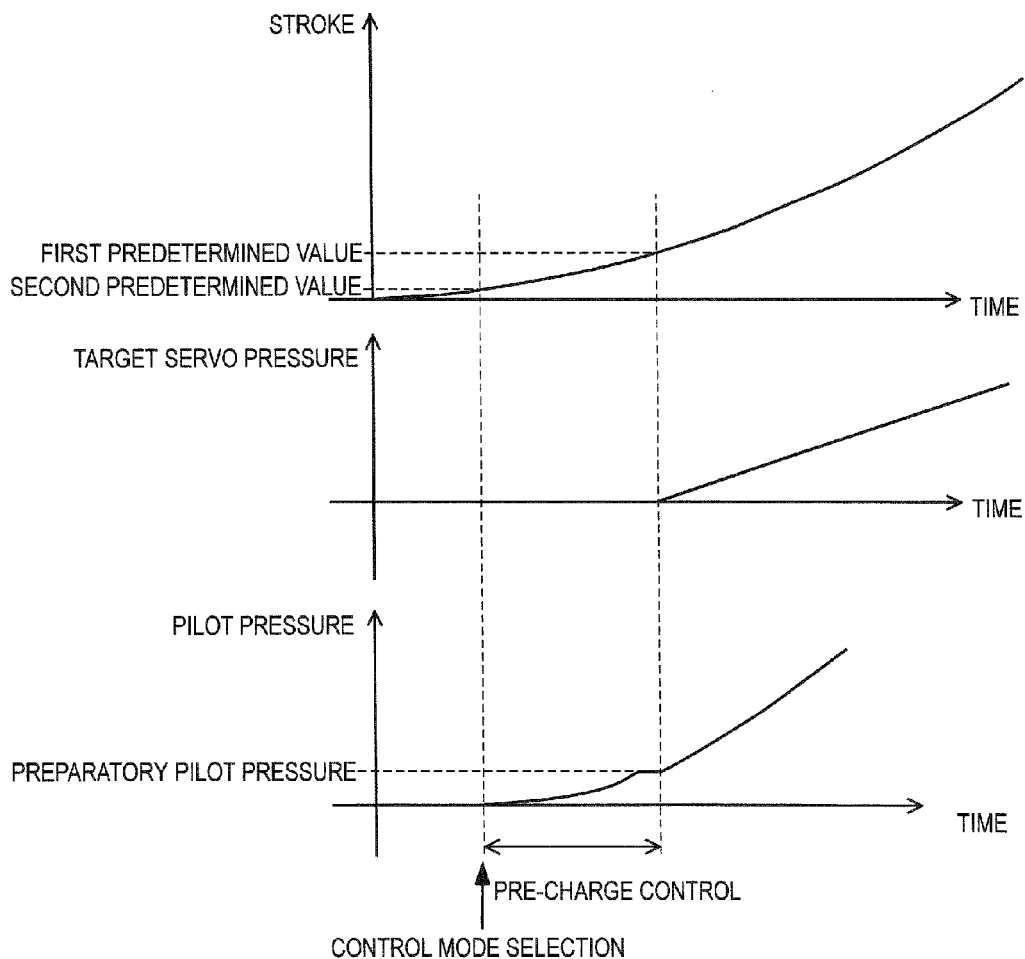
FIG. 3 is an explanatory view for explaining a serenity priority mode according to the first embodiment of the invention.

The first stroke judging portion 61 receives the measurement result of the stroke sensor 71 and based on the measurement result, judges whether or not the stroke of the brake pedal 10 is equal to or less than a first predetermined value (here in this embodiment, the predetermined value is set to 5 mm). As shown in FIG. 3, the first predetermined value according to this embodiment is set to a value at which the target servo pressure is started to increase when the brake pedal 10 is depressed.

The second stroke judging portion 62 receives the measurement result of the stroke sensor 71 and based on the measurement result, judges whether or not the stroke of the brake pedal 10 is equal to or more than a second predetermined value (here in this embodiment, the second predetermined value is set to 3 mm). The second predetermined value according to this embodiment is set to a value larger than a stroke value of the swing of the brake pedal 10 caused by a vibration or swaying of the vehicle. In other words, the second value is set to exclude the generation of stroke of the brake pedal 10 which is generated by a factor other than the operation of the operator of the vehicle. The distance between the second and the first predetermined values (a predetermined range) can be said to be a so-called idling zone in which the target servo pressure does not change even by an intended brake pedal 10 operation of the driver of the vehicle. The first and the second stroke judging portions 61 and 62, as the judging portion, judge whether or not the stroke is within the predetermined range.

The pilot pressure control portion 63 executes the brake control. In other words, the pilot pressure control portion 63 controls the pressure decreasing valve 41 and the pressure increasing valve 42 such that the actual servo pressure (measurement value of the pressure sensor 74) reaches to the target servo pressure. Further, the pilot pressure control portion 63 generates the preparatory hydraulic pressure in the first pilot chamber 4D regardless of the value of the target servo pressure, under the condition that the first stroke judging portion 61 judges that stroke is equal to or less than the first predetermined value and that the second stroke judging portion 62 judges that the stroke is equal to or more than the second predetermined value. In other words, the pilot pressure control portion 63 executes the pre-charge control when the stroke is judged to be within the predetermined range (between the second predetermined value and the first predetermined value) by the first and the second stroke judging portions 61 and 62. More specifically, the pilot pressure control portion 63 starts the pre-charge control when the stroke reaches to the second predetermined value. The pilot pressure control portion 63 executes the pre-charge control based on a control mode selected by a later explained control mode selecting portion 64.

The control mode selecting portion 64 selects one control modes in response to the vehicle state from a control mode group including a plurality of control modes. The control mode selecting portion 64 according to this embodiment memorizes at least two control modes, "responsiveness priority mode" and "serenity priority mode". The responsiveness priority mode is a control mode in which the responsiveness of applying braking force by the operation of the brake pedal 10 has a priority over a suppression of operating noise occurred upon the generation of the preparatory hydraulic pressure and the serenity priority mode is a control mode in which the suppression of operating noise occurred upon the generation of the preparatory hydraulic pressure has a priority over the responsiveness of applying braking force by the operation of the brake pedal 10.

Figure 4:
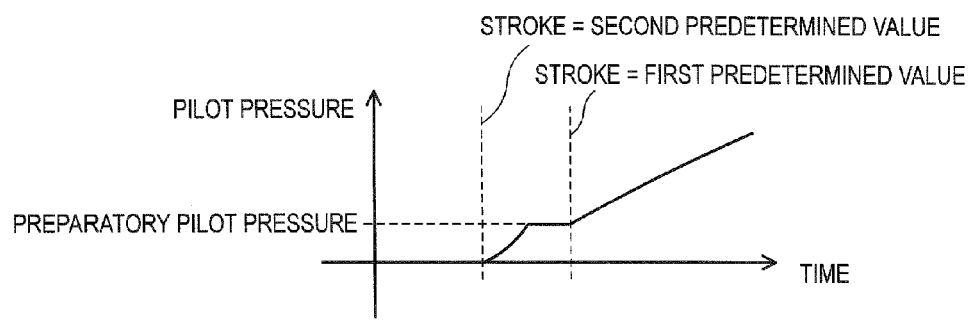
FIG. 4 is an explanatory view for explaining a responsiveness priority mode according to the first embodiment of the invention.

In more detail, the responsiveness priority mode is a control mode in which the opening degree of the pressure increasing valve 42 is set wider than the opening degree in the serenity priority mode and the flow-rate of the operating fluid (brake fluid) flowing into the first pilot chamber 4D is set to be larger than the flow-rate of the operating fluid flowing thereinto in the serenity priority mode. Oppositely, the serenity priority mode is a control mode in which the opening degree of the pressure increasing valve 42 is set narrower than the opening degree in the responsiveness priority mode and the flow-rate of the operating fluid (brake fluid) flowing into the first pilot chamber 4D is set to be smaller than the flow-rate of the operating fluid flowing thereinto in the responsiveness priority mode. In other words, the responsiveness priority mode is not the control mode which gives a priority to the suppression of noises of the operating fluid flowing through the conduits and flowing into the first pilot chamber 4D upon the generation of the preparatory hydraulic pressure but the control mode for the preparatory hydraulic pressure to be quickly generated in the first pilot chamber 4D. On the other hand, the serenity priority mode is the control mode wherein the preparatory hydraulic pressure is gradually slowly generated in the first pilot chamber 4D and the noises of the operating fluid flowing through the conduits and flowing into the first pilot chamber 4 are suppressed. As shown in FIG. 4, the preparatory hydraulic pressure is generated faster in the responsiveness priority mode than in the serenity priority mode. FIG. 3 shows an example of the serenity priority mode and FIG. 4 shows an example of the responsiveness priority mode.

When the stroke is within the predetermined range (between the second and the first predetermined values), the control mode selecting portion 64 receives the measurement result of the stroke sensor 71 and based on the measurement result, detects the change speed of the stroke (for example, the differential value of the stroke). The control mode selecting portion 64 includes as a function, a "change speed calculating portion" which calculates the change speed of the stroke.

According to the embodiment, the control mode selecting portion 64 selects a control mode based on a change speed of the stroke at the time when the stroke value passes through the second predetermined value (for example, the stroke difference between the second predetermined value and the stroke at the time immediately after passing the second predetermined value). The control mode selecting portion 64 selects the responsiveness priority mode when the change speed of the stroke is equal to or more than a first threshold value and selects the serenity priority mode when the change speed of the stroke is less than the first threshold value. According to the embodiment, the control mode selecting portion 64 judges whether or not the stroke is increasing based on the measurement result of the stroke sensor 71 and selects the control mode based on the change speed when the stroke is increasing, When the responsiveness priority mode is selected by the control mode selecting portion 64, the pilot pressure control portion 63 applies a larger control current to the pressure increasing valve 42 to have the opening area thereof larger than the opening area when the serenity mode is selected. On the other hand, when the serenity priority mode is selected by the control mode selecting portion 64, the pilot pressure control portion 63 applies a smaller control current to the pressure increasing valve 42 to have the opening area thereof smaller than the opening area when the responsiveness priority mode is selected. In order to control the pilot pressure, another method may be adopted, in which a target pilot pressure is set and a control current for generating the target pilot pressure is determined based on a relationship between the control current and the pilot pressure, which is calculated based on the accumulator pressure, opening degree of the pressure increasing valve 42 and the rigidity of the first pilot chamber 4D. In such method, the pressure increasing valve 42 is controlled in response to the target pilot pressure. In other words, the inclination of the target pilot pressure and the way of increasing the target pilot pressure are determined by the control mode. Further, the pilot pressure control portion 63 may execute a current control for the pressure increasing valve 42 so that a desired flow amount can be obtained based on the accumulator pressure and the pilot pressure.

Figure 5:
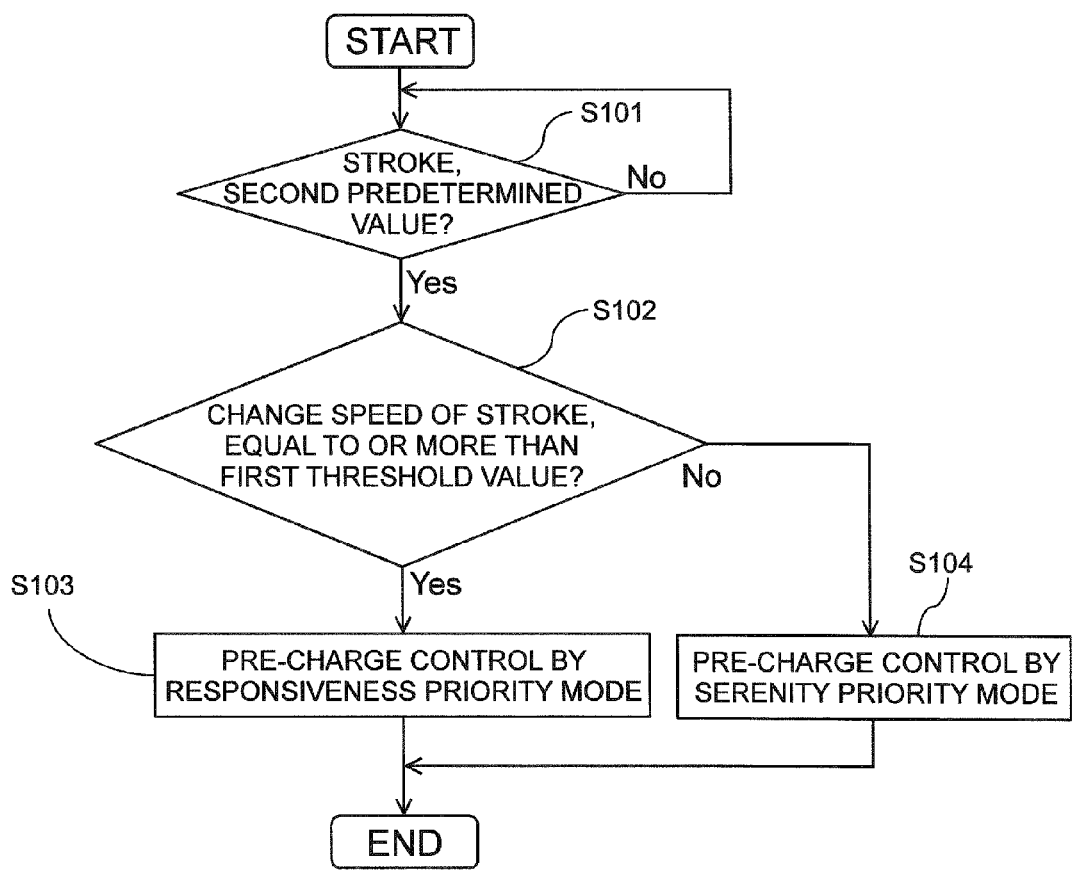
FIG. 5 is a flowchart explaining a pre-charging control according to the first embodiment of the invention.

The flowchart process of pre-charge control by the brake ECU 6 will be explained hereinafter. As shown in FIG. 5, the brake ECU 6 judges whether or not the stroke of the brake pedal 10 is the second predetermined value (which is equal to or less than the first predetermined value) (step S101). When the stroke is judged to be the second predetermined value (S101: YES), the brake ECU 6 judges whether or not the change speed of the stroke is equal to or more than the first threshold value (S102). This step S102 is a step for selecting a control mode in response to the vehicle state.

When the change speed of the stroke is equal to or more than the first threshold value (S102: YES), the brake ECU 6 selects the responsiveness priority mode and makes the opening degree of the pressure increasing valve 42 wider than that in the serenity priority mode and executes the pre-charge control (S103). On the other hand, when the change speed of the stroke is less than the first threshold value (S102: NO), the brake ECU 6 selects the serenity priority mode and makes the opening degree of the pressure increasing valve 42 narrower than that in the responsiveness priority mode and executes the pre-charge control (S104).

According to the first embodiment of the invention, one control mode is selected from the plurality of control modes in response to the change speed of the stroke (depression speed of the brake pedal) at the second predetermined value when the brake pedal 10 is depressed and when the stroke is within the predetermined range, the pre-charge control is executed based on the selected control mode. The change speed of the stroke is an element which influences largely on the necessity of applying the braking force. The control mode is selected from either the responsiveness priority mode which gives priority to the responsiveness or the serenity priority mode which gives priority to the serenity in accordance with the change speed of the stroke. Thus the comfortability for the operator of the vehicle can be improved.

More specifically, according to the first embodiment, when the change speed of the stroke is equal to or more than the first threshold value, urgency for braking operation is presumed to be high and therefore, by selecting the responsiveness priority mode, the pre-charge control is quickly executed by increasing the flow-rate of the operating fluid. On the other hand, when the change speed of the stroke is less than the first threshold value, urgency of braking is presumed to be not so high, and by selecting the serenity priority mode, the flow-rate of the operating fluid is slowed down to reduce the operating noise. Thus, when the operator of the vehicle requires a responsiveness, a quick pre-charge control is executed and when the operator of the vehicle does not require such responsiveness, a gradual slow pre-charge control is executed to avoid generation of uncomfortable operating noise. In other words, according to the first embodiment, the responsiveness can be assured by the pre-charge control to be able to improve the comfortability for the occupant of the vehicle.

Further, according to the first embodiment, the preparatory hydraulic pressure is set such that the servo pressure becomes a value which is equal to or less than a set load of the biasing member 144. Therefore, the first master piston 14 is not driven and the wheel pressure is substantially kept to the atmospheric pressure in the pre-charge control. Thus, the wheel pressure is not increased and accordingly, the ineffective fluid amount in the pilot chamber can be reduced. The ineffective fluid amount means the fluid amount introduced into the pilot chamber by which the servo pressure would not be changed. Therefore, by keeping the responsiveness of the braking force, generation of dragging can be surely prevented. For example, upon pre-charge control, a dragging (unnecessary braking force) may be generated due to a deviation of the separation distance among individual devices, a deviation of the separation distance due to the knockback or an accidental error between the detected value of the wheel pressure and the actual wheel pressure. However, according to the pre-charge control of this embodiment, such generation of dragging can be surely prevented. It may be said that the brake ECU 6 may be equipped with a hydraulic pressure control portion which generates a preparatory hydraulic pressure in the servo pressure 1A or the pilot chamber 4D.

Second Embodiment

The brake device according to the second embodiment is different in structure compared to the structure of the first embodiment in that the control mode is selected based on the vehicle speed (speed of the vehicle). Accordingly, only the different points will be explained for the second embodiment as follows.

The control mode selecting portion 64 selects the control mode based on the detection result of the vehicle wheel speed sensor 76 (corresponding to the detecting portion and the second sensor), i.e., based on the vehicle speed. The control mode selecting portion 64 selects the responsiveness priority mode when the vehicle speed is equal to or more than a second threshold value and selects the serenity priority mode when the vehicle speed is less than the second threshold value (including the value zero (0)), while the stroke is the second predetermined value. According to this second embodiment, the second threshold value is set to be a very low speed (for example, equal to or less than a driving speed at a crawl).

It is presumed that the necessity of the responsiveness of the braking force is high as the vehicle is driving with a high speed and is low as the vehicle is driving with a low speed. The brake ECU 6 according to the second embodiment executes a pre-charge control quickly when the vehicle is driving with a relatively high speed where the running noise is relatively high and the high responsiveness for the braking force is required and executes a pre-charge control slowly when the vehicle is driving with a relatively low speed where the running noise is relatively small and the high responsiveness of the braking force is not required. Thus the operating noise can be suppressed. The control flow according to the second embodiment corresponds to a control flow where the step S102 in FIG. 5 is replaced from "the change speed of the stroke is equal to or more than the first threshold value?" to "the vehicle speed is equal to or more than the second threshold value?"

According to the second embodiment, the pre-charge control is executed, keeping the operating noise such as flowing noise of the operating fluid to be in a suppressed state when the braking operation is performed under the vehicle being running with a low speed or being stopped. Thus, a generation of uncomfortable noise of operating fluid upon braking operation can be suppressed not to give an uncomfortable feeling to the occupant of the vehicle. In other words, according to the second embodiment, as same with the first embodiment, the comfortability of the occupant can be improved keeping the responsiveness by pre-charge control. The vehicle speed may be calculated by other sensors (such as an acceleration sensor or the like).

Third Embodiment

The brake device according to the third embodiment is different in structure from the first embodiment in the point that the control mode is selected based on a particular operation (in this third embodiment, door unlocking operation). Accordingly, this different point will be explained hereinafter.

Figure 6:
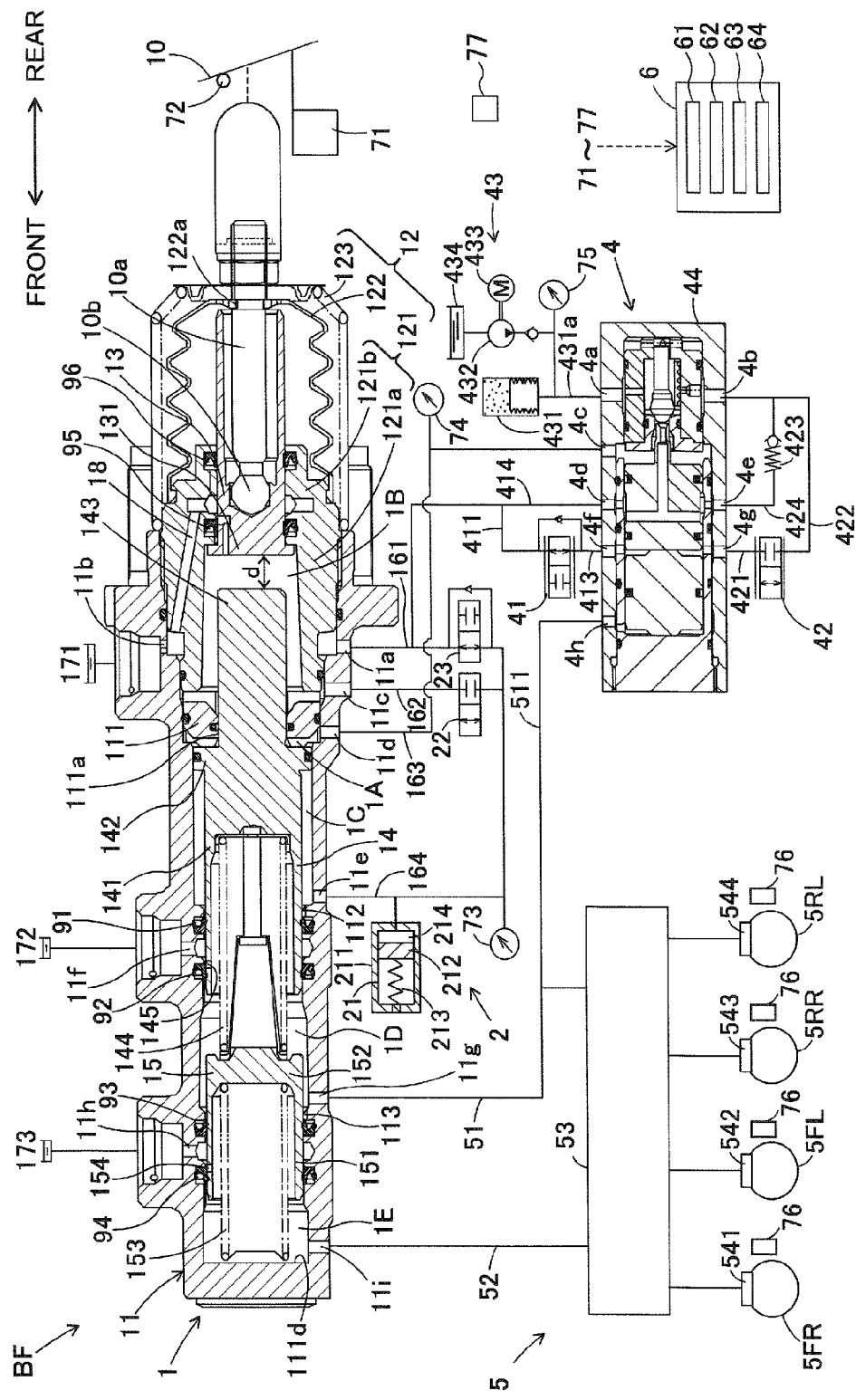
FIG. 6 is a structural view showing a structure of the brake device according to a third embodiment.

The brake device according to the third embodiment includes a door sensor 77 shown in FIG. 6 (corresponding to the detecting portion and the third sensor) which detects that a door (not shown) is unlocked. When the door sensor 77 detects that the door is unlocked, the detected result is sent to the brake ECU 6. The control mode selecting portion 64 selects the control mode based on the detected result of the door sensor 77 when the vehicle is in stopping state (vehicle speed is zero).

More specifically, the control mode selecting portion 64 selects the serenity priority mode when the door unlocking state is detected by the door sensor 77. The pilot pressure control portion 63 generates the preparatory hydraulic pressure in the first pilot chamber 4D in the serenity priority mode, regardless of whether the brake operation is performed or not when the serenity priority mode is selected. Thus, when the operator of the vehicle depresses the brake pedal for braking operation before the vehicle is started, the preparatory hydraulic pressure has been already generated or is under generation in the serenity priority mode and accordingly, an uncomfortable feeling derived from an operating noise would not be given to the operator of the vehicle.

The pilot pressure control portion 63 may execute the pre-charge control after the stroke of the brake pedal 10 became a value within the predetermined range after the serenity priority mode is selected. The particular operation is not limited to the door unlocking operation, but may be, for example, ignition switch ON operation, or seating operation by the occupant of the vehicle. The ignition switch ON can be detected, for example, by an ignition sensor. The seating operation by the occupant can be detected, for example, by an occupant detecting sensor or a buckle sensor of an occupant restraining device. The particular operation is an operation based on which a braking operation is presumed to be performed next under the vehicle being in a stopped state.

Fourth Embodiment

The brake device according to the fourth embodiment is different in the serenity prior mode from the first embodiment in the controlling way and basis for selecting the serenity priority mode and the different points will be explained hereinafter.

The serenity priority mode according to the fourth embodiment is a mode for keeping the preparatory hydraulic pressure (state that the preparatory hydraulic pressure has been generated). In other words, the serenity priority mode is a control mode which keeps the pilot pressure at the preparatory hydraulic pressure. The serenity priority mode is a control mode in which the pilot pressure decreasing is stopped from the state where the pilot pressure is equal to or more than the preparatory hydraulic pressure based on, for example, the detection result of the pressure sensor 74 so that the pilot pressure becomes the preparatory hydraulic pressure and keeps the pilot pressure at the preparatory hydraulic pressure.

The control mode selecting portion 64 judges whether the stroke is decreasing or not based on the detection result of the stroke sensor 71 during the operation. When the control mode selecting portion 64 judges that the stroke is decreasing and that the stroke becomes the first predetermined value, the control mode selecting portion 64 selects the serenity priority mode. The pilot pressure control portion 63 stops pressure decreasing of the pilot pressure and keeps the pressure when the serenity priority mode is selected during the pressure decreasing operation in response to the stroke so that the pilot pressure becomes the preparatory hydraulic pressure. In other words, the pilot pressure control portion 63 closes the pressure decreasing valve 41 so that the pilot pressure becomes the preparatory hydraulic pressure based on the pressure sensor 74.

If the vehicle is stopped by deceleration after the vehicle running, if and thereafter for example, the shift lever of the transmission is placed into the parking range and a foot of the operator of the vehicle on the pedal 10 is released from the brake pedal 10, the target servo pressure decreases and the pressure decreasing valve 41 opens to make the pilot pressure decreasing. According to the fourth embodiment, when the control mode selecting portion 64 recognizes that the stroke is decreasing and is decreased to a predetermined value, the serenity priority mode is selected as the control mode and accompanied by the selection of the serenity priority mode, the pilot pressure control portion 63 closes the pressure decreasing valve 41 so that the pilot pressure is kept to be the preparatory hydraulic pressure. Thus, the control state becomes the state that the preparatory hydraulic pressure is generated in the first pilot chamber 4D, under the state that the brake pedal 10 is not depressed, i.e., the state that the pre-charge control has been executed. This pre-charge state is kept and thereafter when the brake pedal 10 is re-depressed to start the vehicle (to shift the shift lever to the drive range), the pressure has been already pre-charged and the flow-rate becomes zero (small in flow-rate). Therefore, no operating noise accompanied by the pre-charge control is generated. In other words, by the pre-charge control which gives the priority to the serenity, an uncomfortable feeling of the occupant of the vehicle due to the noise derived from the flow of the operating fluid can be prevented.

The release of the serenity priority mode, i.e., the stop of the control for keeping the preparatory hydraulic pressure is executed, for example, when the engine is stopped (ignition switch is turned OFF) or the vehicle is started (the vehicle speed becomes larger than zero).

The serenity priority mode according to the fourth embodiment may be added as a second serenity priority mode to the control mode group in the first through third embodiments. In this case, the control mode selecting portion 64 in the first through third embodiments selects the second serenity priority mode when recognizing that the stroke is decreasing and the stroke value becomes the predetermined value. In this case too, the above advantageous effects can be obtained.

Other Embodiments

The invention is not limited to the embodiments explained above. For example, the change speed of the stroke may be detected based on a reaction force pressure against the brake pedal 10 (corresponding to the measurement value of the pressure sensor 73) instead of using the stroke sensor 71. The change of the reaction force pressure can be converted into the change of the stroke. Thus as one example of detecting the state of the vehicle, a measurement result of a sensor which measures the value relative to the stroke can be used.

Further, at least one of the responsiveness priority mode and the serenity priority mode can be stepwise divided into a plurality of control modes. For example, the control mode group may include a first responsiveness priority mode, a second responsiveness priority mode, a third responsiveness priority mode, a first serenity priority mode and a second serenity priority mode. Each control mode is selected according to the vehicle state and these modes are different from each other, for example, in the magnitude of the flow-rate of the operating fluid. The relationship of the magnitude of the flow-rate of the operating fluid in each mode may be set, for example, such as flow-rate of the operating fluid in the first responsiveness priority mode>flow-rate of the operating fluid in the second responsiveness priority mode>flow-rate of the operating fluid in the third responsiveness priority mode>flow-rate of the operating fluid in the first serenity priority mode>flow-rate of the operating fluid in the second serenity priority mode. A plurality of threshold values (predetermined values) are set for the vehicle states.

Further, any combinations of the first through fourth embodiments may also constitute the present invention. For example, when combining the first and the second embodiments, the control mode selecting portion 64 selects the control mode based on the change speed of the stroke and the vehicle speed. In this case, for example, if more priority is given to the vehicle speed than to the change speed of the stroke, the control mode selecting portion 64 may be set to select the responsiveness priority mode based on the vehicle speed not based on the change speed of the stroke when the vehicle speed is high and to select the control mode based on the change speed of the stroke when the vehicle speed is low. The control mode selecting portion 64 may select a control mode based on a pattern of a plurality of combination patterns indicating the vehicle states, for example, may select a control mode by allotting the control modes which are pre-selected in advance with respect to four patterns formed by the range of the change speed of the stroke, a fast range and a slow range thereof and the range of the vehicle speed, a fast range and a slow range thereof. Thus more precise control can be achieved to thereby improve the comfortability of the occupant. If combined all of the four embodiments, the brake device is equipped with the stroke sensor 71, the vehicle wheel speed sensor 76 and a sensor for detecting the particular operation (for example the door sensor 77) as the detecting portion for detecting the state of the vehicle.

It may be possible that the preparatory hydraulic pressure is set such a value at the braking force applied to the vehicle wheels 5FR through 5RL by the wheel cylinders 541 through 544 becomes equal to or less than a predetermined. In this case, a pressure sensor (not shown) which measures the master pressure is provided relative to the first master chamber 1D (or the second master chamber 1E). This pressure sensor is provided, for example, to the conduit 51. Accordingly, the pilot pressure can be increased from zero to the value immediately before the braking force increases. This means that a clearance between the brake pad and the brake rotor can be shortened to improve further responsiveness of braking operation.

Further, the pilot pressure control portion 64 may be set to control such that a predetermined amount of operating fluid corresponding to the preparatory hydraulic pressure is supplied to the first pilot chamber 4D when the preparatory hydraulic pressure is generated. The time to complete the supply of the predetermined amount fluid is changed depending on the control mode. According to this control, the necessary fluid amount for the first pilot chamber 4D to be filled with the preparatory hydraulic pressure can be calculated in advance and therefore the control for supplying the first pilot chamber 4D with the necessary fluid can be set in advance and accordingly there needs no detection of the wheel pressure, servo pressure or the pilot pressure. This can eliminate the pressure observation by the pressure sensor or the sensors and a simple control can be achieved.

Further, the control mode is not limited to those explained above. The control mode selecting portion 64 may be structured to select a control mode from a control mode group formed by a plurality of control modes, in response to a change speed of the stroke. By setting the change speed of the stroke as a basis for selecting the control mode, a pre-charge control which more suitably agrees with an intention of the operator of the vehicle can be executed. This can also improve the comfortability of the occupant of the vehicle. Further, the second predetermined value is not limited to the value as explained above embodiments and any value which is smaller than the first predetermined value may be set as the second predetermined value.

Further, this invention can be applicable to a hydraulic pressure braking force generating device which does not have a regulator 44 (pilot chamber 4D). In such case, the pre-charge control is executed directly to the servo chamber 1A. For example, the servo pressure generating device 4 may be structured such that the operating fluid can be supplied from the accumulator 431 to the servo chamber 1A via the pressure increasing valve 42. The brake ECU 6 control the pressure increasing valve 42 to generate the preparatory hydraulic pressure in the servo chamber 1A. The brake ECU 6 selects the control mode in response to the state of the vehicle and generates the preparatory hydraulic pressure in the servo chamber 1A in response to the selected control mode. Thus, the securing of the responsiveness and the improvement of the comfortability of the occupant in the pre-charge control can be realized as similar to those of the previous embodiments. Even in case no pilot chamber 4D is provided in the servo pressure generating device 4, the brake ECU 6 may be provided with a judging portion (61 and 62). The brake ECU 6 in this case may be provided with a servo pressure control portion which generates the preparatory hydraulic pressure in the servo chamber 1A by controlling the valve device (41 and 42) when the judging portion judges that the stroke is equal to or less than the predetermined value.

Obviously, numerous modifications and variations of the present invention are possible in light of the above teachings. It is therefore to be understood that within the scope of the appended claims, the present invention may be practiced otherwise than as specifically described herein.

The invention claimed is:

1. A brake control device applied to a hydraulic pressure braking force generating device equipped with a wheel cylinder which applies a braking force to a vehicle wheel;
a master cylinder which outputs a master pressure to the wheel cylinder by driving a master piston by a servo pressure inputted to a servo chamber; and
a hydraulic pressure generating device which outputs a desired hydraulic pressure to the servo chamber, wherein the brake control device includes:
an electronic control unit which is configured to generate a preparatory hydraulic pressure in a pilot chamber when the hydraulic pressure generating device is equipped with the pilot chamber contributing to a generation of the servo pressure and to generate the preparatory hydraulic pressure in the servo chamber when the hydraulic pressure generating device is not equipped with the pilot chamber; and
a sensor which detects a vehicle state being correlated with a responsiveness of the braking force; and wherein
the electronic control unit is configured to select one control mode based on the vehicle state detected by the sensor from a control mode group including at least two control modes which are a responsiveness priority mode which gives more priority to the responsiveness of the braking force relative to an operation of a brake operating member than to a suppression of an operating noise occurred upon the generation of the preparatory hydraulic pressure and a serenity priority mode which gives more priority to the suppression of the operating noise occurred upon the generation of the preparatory hydraulic pressure than to the responsiveness of the braking force and wherein the electronic control unit is configured to control the hydraulic pressure generating device to generate the preparatory hydraulic pressure in response to the selected control mode.

2. The brake control device according to claim 1, wherein the hydraulic pressure generating device includes:
a mechanical pressure adjusting device which outputs the servo pressure to the servo chamber in response to a pilot pressure which has been inputted to the pilot chamber; and
a valve device which outputs the desired hydraulic pressure to the pilot chamber and wherein,
the electronic control unit is configured to judge whether or not a stroke of the brake operating member is equal to or less than a predetermined value which is set to a value at which the servo pressure is started to increase in response to an operation of the brake operating member, and to generate the preparatory hydraulic pressure in the pilot chamber by controlling the valve device when it is judged that the stroke of the brake operating member is equal to or less than the predetermined value.

3. The brake control device according to claim 2, wherein the electronic control unit is configured to supply the pilot chamber with an amount of the operating fluid corresponding to the preparatory hydraulic pressure by controlling the valve device.

4. The brake control device according to claim 1, wherein the serenity priority mode is the control mode in which a flow-rate of operating fluid which generates the preparatory hydraulic pressure is lessened compared to the flow-rate of the operating fluid in the responsiveness priority mode;
the sensor includes a first sensor which measures a value regarding the stroke of the brake operating member; and wherein
the electronic control unit is configured to select the control mode based on a change speed of the stroke based on a measured result of the first sensor when the stroke of the brake operating member is less than a predetermined value which is set to a value at which the servo pressure is started to increase in response to an operation of the brake operating member.

5. The brake control device according to claim 1, wherein the serenity priority mode is the control mode in which a flow-rate of the operating fluid which generates the preparatory hydraulic pressure is lessened compared to the flow-rate of the operating fluid in the responsiveness priority mode;
the sensor includes a second sensor which measures a value regarding a vehicle speed; and wherein
the electronic control unit is configured to select the control mode based on a measured result of the second sensor.

6. The brake control device according to claim 1, wherein the serenity priority mode is the control mode in which a flow-rate of the operating fluid which generates the preparatory hydraulic pressure is lessened compared to the flow-rate of the operating fluid in the responsiveness priority mode, and
the sensor includes a third sensor which detects at least one particular operation among a door unlocking operation, an ignition "ON" operation and an occupant seating operation, which are defined as particular operations, and wherein
the electronic control unit is configured to select the serenity priority mode as the control mode when the third sensor detects the at least one particular operation.

7. The brake control device according to claim 1, wherein the serenity priority mode is the mode for maintaining the preparatory hydraulic pressure;
the sensor includes a first sensor which measures a value regarding the stroke of the brake operating member; and wherein
the electronic control unit is configured to judge whether or not a stroke of the brake operating member is decreasing based on a measured result of the first sensor and to select the serenity priority mode based on a judgment that the stroke is decreasing and is decreased to a predetermined value which is set to a value at which the servo pressure is started to increase in response to an operation of the brake operating member.

8. The brake control device according to claim 1, wherein the control mode group includes a second serenity priority mode wherein the preparatory hydraulic pressure is maintained;
the sensor includes a first sensor which measures a value regarding a stroke of the brake operating member; and wherein
the electronic control unit is configured to judge whether or not the stroke of the brake operating member is decreasing based on a measured result of the first sensor and to select the second serenity priority mode based on a judgment that the stroke is decreasing and is decreased to a predetermined value which is set to a value at which the servo pressure is started to increase in response to an operation of the brake operating member.

9. The brake control device according to claim 1, wherein the preparatory hydraulic pressure is set to a value so that the hydraulic pressure in the wheel cylinder is kept to be substantially an atmospheric pressure.

10. The brake control device according to claim 9, wherein the preparatory hydraulic pressure is set to a value so that the servo pressure does not change or becomes equal to or less than a set load of a biasing member which biases the master piston towards an initial position when the hydraulic pressure generating device is equipped with the pilot chamber; and wherein the preparatory hydraulic pressure is set to a value so that the servo pressure becomes equal to or less than the set load of the biasing member which biases the master piston towards the initial position when the hydraulic pressure generating device is not equipped with the pilot chamber.

11. The brake control device according to claim 1, further comprising:

a master pressure sensor which is configured to detect the master pressure which is a hydraulic pressure in the master cylinder, wherein the electronic control unit is configured to generate the preparatory hydraulic pressure so that the braking force to be applied to the vehicle wheel by the wheel cylinder becomes equal to zero based on a detected result of the master pressure sensor.

12. A brake control device applied to a hydraulic pressure braking force generating device equipped with a wheel cylinder which applies braking force to a vehicle wheel;

a master cylinder which outputs a master pressure to the wheel cylinder by driving a master piston by a servo pressure inputted to a servo chamber;

a mechanical pressure adjusting device which outputs the servo pressure to the servo chamber in response to a pilot pressure which has been inputted to a pilot chamber; and a valve device which outputs a desired hydraulic pressure to the pilot chamber, wherein the brake control device includes:

a first sensor which is configured to detect a stroke of a brake operating member; and an electronic control unit which is configured to judge whether or not the stroke of the brake operating member is within a predetermined range which ranges from a first predetermined value to a second predetermined value, wherein the first predetermined value is set to a value at which the servo pressure is started to increase in response to an operation of the brake operating member and the second predetermined value is set to a value larger than a stroke value of swing of the brake operating member caused by a vibration or swaying of the vehicle, to calculate a value regarding a change speed of the stroke within the predetermined range, to generate the preparatory hydraulic pressure in the pilot chamber by controlling the valve device when it is judged that the stroke of the brake operating member is within the predetermined range, to memorize a control mode group including a plurality of control modes for generating the preparatory hydraulic pressure, to select one control mode from the control mode group based on the calculated value regarding the change speed, and to control the valve device in response to the selected control mode thereby to generate the preparatory hydraulic pressure in the pilot chamber.

* * * * *